D. V. Crandall.
Spring Bed Bottom.

116815

PATENTED JUL 11 1871

Witnesses
A. H. Sherburne
N. C. Gridley

Inventor
D. V. Crandall
By Farwell & Co
his Attys

UNITED STATES PATENT OFFICE.

DELOS V. CRANDALL, OF CHICAGO, ILLINOIS.

IMPROVEMENT IN SPRING BED-BOTTOMS.

Specification forming part of Letters Patent No. 116,815, dated July 11, 1871.

*To all whom it may concern:*

Be it known that I, DELOS V. CRANDALL, of Chicago, in the county of Cook and State of Illinois, have invented a new and useful Improvement in Spring Bed-Bottoms; and I do hereby declare the following to be a full, clear, and exact description thereof, which will enable others skilled in the art to which my invention appertains to make and use the same, reference being had to the accompanying drawing forming part of this specification, in which—

Figure 1:
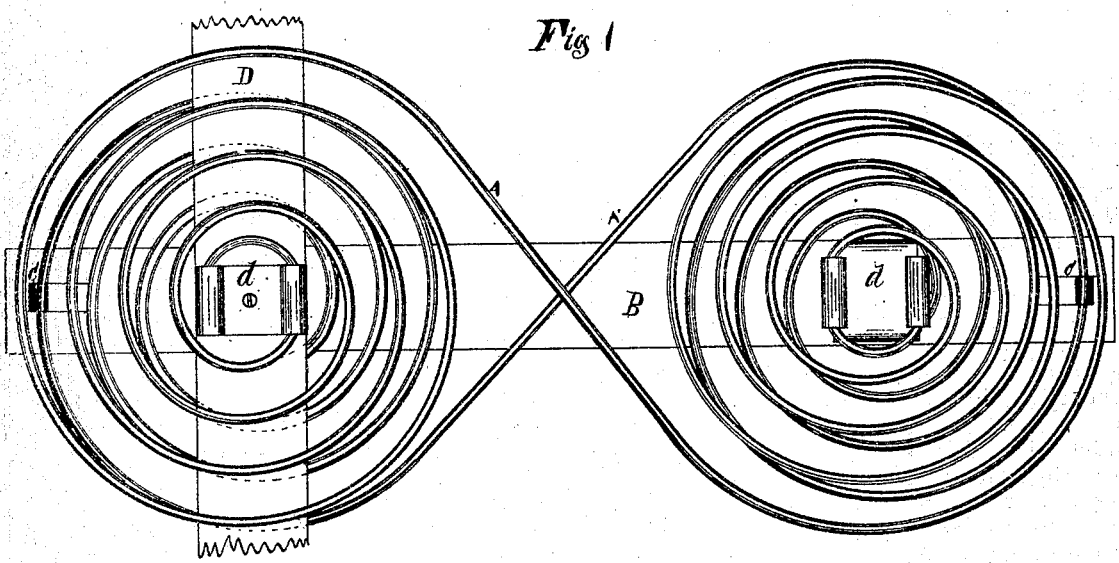
Figure 2:
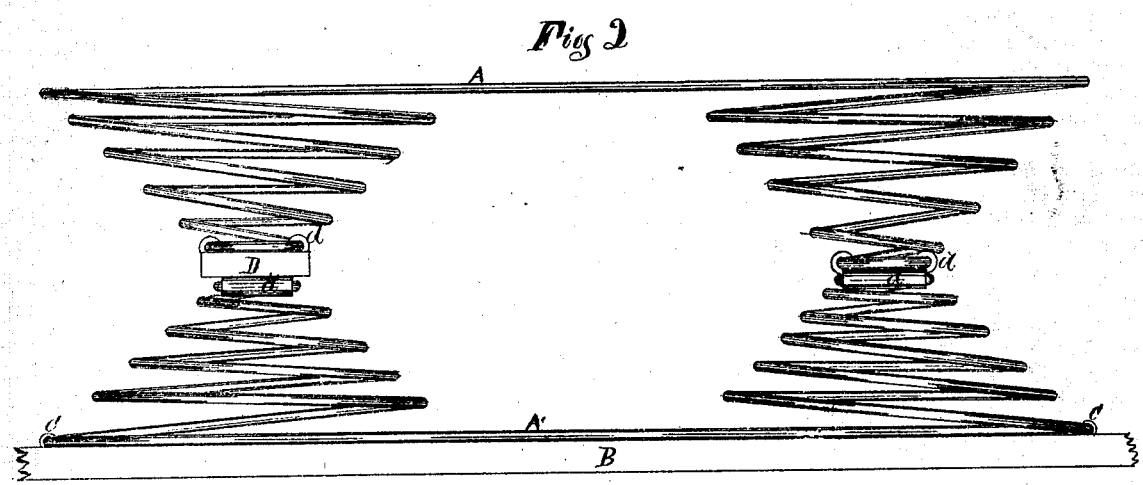

Figure 1 is a top view of the springs employed in my invention. Fig. 2 is a side elevation of the same.

Similar letters of reference indicate corresponding parts in the several figures of the drawing.

The object of my invention is to provide a series of springs for bed-bottoms, sofas, and lounges, which is so arranged as to retain its proper elasticity; and the nature of the improvement consists in connecting a series of conical-shaped spiral springs in such a manner as to prevent the same from recoiling under the weight applied, by which means the proper degree of elasticity is retained.

In the accompanying drawing, A A' indicate the springs, which may be of any desired size of wire that will insure the required strength. Said springs are made each of one continuous piece of wire, the ends of which are bent or coiled in an annulose conical shape, by which the proper elasticity is obtained. To the upper surface of the lower portion of the frame-work B of the bed-bottom I secure the base of the conical portion of springs A' by means of clasps or staples $c\ c$ passing over or around the wire forming the same. I then invert springs A, and attach the same to springs A' by means of clasps $d\ d$, which are firmly locked together. Said clasps are made from the ordinary band-iron, the ends of which are bent, forming an eye, into which the ends of the springs are introduced. It is sometimes found necessary to connect said springs in the center laterally across the frame of the bed-bottom, in which case I provide a rail, D, to which I secure the staples $d\ d$ by means of screws or rivets passing through the same. Should a greater strength of spring be required the wire forming the lower springs A' may be increased in size, by which means the desired result is obtained.

It is a fact long established by actual use that the ordinary spiral spring, when subjected to continual use, will lose its elasticity by the uncoiling of the same, while with my invention this difficulty is practically overcome, as the whole is firmly connected together, thus equalizing the strain, by which means their elasticity is fully retained.

Having thus described my invention, what I claim as new, and desire to secure by Letters Patent, is—

The combination of rail D, clasps $d\ d'$, and springs A A', the whole constructed and arranged substantially in the manner and for the purpose specified.

DELOS V. CRANDALL.

Witnesses:
N. H. SHERBURNE,
L. N. FARWELL.